United States Patent Office 3,222,352
Patented Dec. 7, 1965

3,222,352
MONOAZO FIBER REACTIVE DYES
John J. Monagle, Jr., Claymont, Del., assignor to E. I. du Pont de Nemours and Company, Wilmington, Del., a corporation of Delaware
No Drawing. Filed Sept. 15, 1959, Ser. No. 840,029
The portion of the term of the patent subsequent to Nov. 5, 1980, has been disclaimed
4 Claims. (Cl. 260—157)

This invention relates to novel compositions of matter useful as fiber reactive dyes for materials possessing in their structure exchangeable hydrogen atoms. More particularly, this invention deals with dyes for textile fibers and similar materials (including paper, leather, plastic film, etc.), which possess in their molecules or miscelles reactive radicals such as OH, NH or $NH_2$. Common illustrations of such materials are cellulosic fiber, wool, silk, nylon and polyvinyl alcohol film.

Reactive dyes constitute a new type of dyes of relatively recent development. In these dyes, the dyeing capacity depends, not on physical affinity between the dye and fiber, but on direct chemical reaction (with covalent bonds) between the dye and certain reactive radicals in the fiber. Such dyes generally have the form

wherein D is the essential molecule of a dye, in other words, a compound containing a chromophoric group; S is a solubilizing group, such as sulfo or carboxy in the case of acid dyes, or a positively charged N-atom in the case of a basic dye; and Q is a reactive radical through which the dye molecule is reacted with the OH groups or $NH_2$ groups of the fiber.

Heretofore, monochloro- and dichlorotriazine radicals have generally been used as reactive radicals, although others have been suggested or, in some cases, used, probably without recognition of their effect in changing the mode by which the dye molecule reacted with the fiber. But in most of these cases the dye does not have high hydrolytic stability. In the presence of alkali, the reactive radical or "link" Q tends to split off by reaction with water or alkali, thereby necessarily diminishing the percentage of activated dye that remains for reaction with the fiber.

In another method (Stallmann et al., U.S.P. 2,643,250), an isocyanate dimer radical was employed in the character of said reactive group or link Q, but the resulting colors were again highly reactive with water, and gave poor fixation on cellulosic material unless they were applied thereto in the absence of water.

In copending application Serial No. 781,408 (now abandoned), in which I am a joint inventor with Victor Tullio, a new class of fiber-reactive dyes has been proposed, wherein the reactive link is an aryl carbamate group, i.e. the radical NH—CO—OR, wherein R is phenyl, naphthyl, biphenyl, etc. These dyes do not require the use of strong alkali in their application.

My present invention has as its primary object to develop new fiber-reactive dyes which employ a novel reactive link, thereby providing an opportunity for new improvements in the method of application and for new qualities in the dyeings obtained thereby. A particular object of my invention is to provide a new class of fiber-reactive dyes which are characterized by a high degree of hydrolytic stability, which do not require drying of the impregnated fabric prior to the final heat treatment, which will enable one to achieve said final heat treatment by the aid of steam, and which—provided certain precautions are observed in the selection of the dye chromophore—may lead to dyeings of improved bleach-fastness. Various additional advantages and achievements of my invention will become apparent as the description proceeds.

Stated in briefest terms, my present invention embraces a new series of fiber-reactive dyes in which the reactive link is an N-substituted aryl carbamato group. More particularly, the novel dyes of this invention are represented in their simplest form by the formula

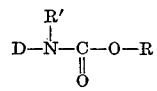

wherein D is the radical of a dye molecule, that is the radical of a compound containing one or more chromophoric groups, R' is an alkyl, cycloalkyl, or aralkyl group that may have selected substituents as more fully set forth below, and R is the radical of a convenient or economical aromatic compound. For instance, R' may be a lower alkyl radical (1 to 4 C-atoms), a cycloalkyl radical or an aralkyl radical of not over 10 C-atoms, or it may be a member of this group which itself bears substituents (located in the ring, in the case of the aralkyl radical) such as chloro, cyano, nitro, alkoxy (1 to 4 C-atoms) and ionogenic water-solubilizing radicals (e.g. sulfo or carboxyl). R is an aromatic radical having from 6 to 12 carbon atoms in its ring structure, and it may contain such substituents as lower alkyl (1 to 4 C-atoms), lower alkoxy, halogen, cyano, nitro, ionogenic water-solubilizing groups such as carboxy, phosphono, sulfo, alkyl esters of inorganic water-solubilizing groups, and lower alkyl and lower alkoxy groups having ionogenic water-solubilizing substituents.

D likewise may contain ionogenic solubilizing groups such as sulfo, carboxy or a positively charged N-atom. It will be noted, however, that this invention is not limited to the production of water-soluble dyes, and where neither D nor R contains water-solubilizing groups, the novel compounds of this invention may be applied to the material being colored therewith from an aqueous dispersion or from an organic solvent solution.

The above formula represents the simplest form of dyes embraced in this invention. My invention, however, is of broader nature and includes in its scope dyes which possess two dye radicals of type D for each radical R (and, of course, two N-substituted carbamate links therebetween) as well as dyes wherein the radical D, which may contain more than one chromophore, is linked to 2 or 3 aryl carbamate radicals as above defined.

Dyes of the above simple formula may be synthesized by reacting an amine of formula

with an aryl chloroformate of the formula

D and R having the same meanings as above, in a convenient solvent, in a temperature range of about 20° to about 125° C., whereby HCl is eliminated, and the dye is obtained according to the following equation:

EQUATION 1

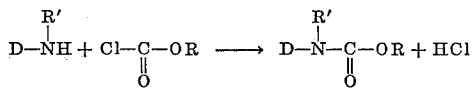

An excess of the chloroformate may be employed.

If an aryl bis-chloroformate and 2 moles of the dye-substituted amine are used, a compound constituting a potential source for two dye molecules is obtained, thus:

EQUATION 2

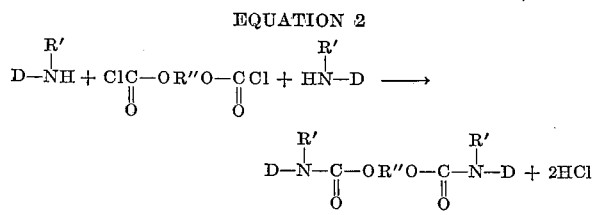

If a dye-bis(substituted amine) is used, together with two or more moles of the aryl chloroformate, the reaction may be represented as follows:

EQUATION 3

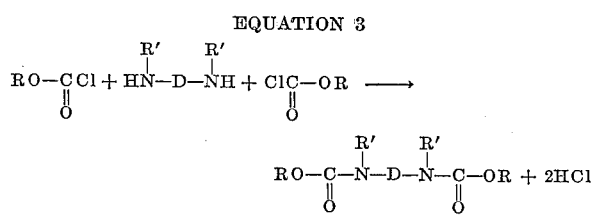

It will be noted that the dyes of my present invention differ structurally from those obtainable in my said joint copending application, Serial No. 781,408, in that the free H on the N-atom of the carbamato group in the latter is here replaced by an organic radical R' which is attached to the N-atom of the carbamato group through a CH₂ group. (This statement, of course, applies also to the case where R' is CH₃.) While off-hand this appears to be a relatively simple substitution, it is not actually so, inasmuch as the resulting compound has substantially different qualities and apparently different behavior toward the fiber than the carbamates having an NH group.

To begin with, it is known that carbamates of the form Q—NH—CO—OR (wherein Q may be hydrogen or any radical at random) are generally readily converted into isocyanates upon heating. This transformation may be expressed by the equation:

Q—NH—CO—OR → Q—NCO + R—OH

Such transformation, however, has no opportunity of proceeding in the case of an N-substituted carbamate of form

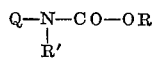

Consequently, if it be postulated that the dye compounds of my said copending application react with the fiber through a mechanism which involves transient formation of an isocyanate (the logic of which postulate would seem strengthened by the fact that the fabric must be heated in the range of 105° to 200° C. for reaction with the dye), such a mechanism would not apply to the case of N-substituted carbamate dyes.

Secondly, the carbamate dyes of my copending application do not require a strong alkaline treatment of the fiber together with or subsequently to impregnation with the dye and prior to heating, whereas the novel dyes of this invention do require such alkaline treatment.

Thirdly, in the invention of said copending application, the impregnated fiber must be dried before being exposed to the elevated heat treatment (105° to 200° C.), whereas in the instant invention, on the contrary, the intermediate drying step may be omitted. This fact in turn enables one to use steam for heating the impregnated fiber in this invention, whereas in the case of the NH-type carbamates steam is inapplicable.

Finally, the substitution of R' on the N-atom makes the carbamate group relatively inert to bleach; therefore, provided the chromophore D in the above general formula is free of bleach-sensitive OH or NH (and NH₂) groups, the dyeings produced according to this invention are fast to bleach.

In the dyeing of fabric my novel dyes are applied to the fabric, at room temperature or higher, from an aqueous bath (solution or suspension) or from a solution in a convenient organic solvent (e.g. dimethylformamide, dimethylacetamide, methyl Cellosolve or mixtures of these solvents) or from an aqueous printing paste, as the case may be. The fabric is then heated in the presence of an alkaline agent at a temperature in the range of 100° to 225° C. for a convenient period (say 30 seconds to 10 minutes depending on the dye, temperature and alkaline agent). During the heating step an aromatic hydroxy compound corresponding to the original aromatic chloroformate is split off, and the remainder of the dye molecule forms a carbamate or urea link between dye and textile. In the case of cellulose, and taking the simple form of the dye for illustration, the reaction may be expressed:

$$\text{D—NR'COOR} + \text{Cell-OH} \xrightarrow{\text{alkali}} \text{D—NR'COO-Cell} + \text{ROH}$$

For the case of material having NH or NH₂ groups, the reaction may be represented:

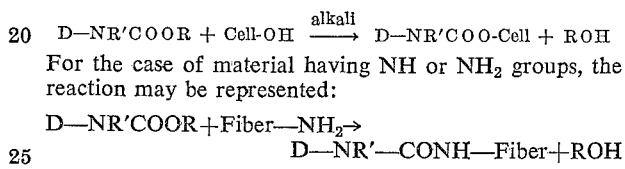

In practice, the new dyes may be applied to cellulosic fibers by either of two procedures. In one procedure the fabric is impregnated by padding, steeping, package dyeing or similar technique with an aqueous solution or suspension of the dye that also contains the alkaline reagent needed to promote the reaction between the dye and the fiber. The fiber bearing the alkaline dye solution or suspension is then heated or steamed with or without being dried before the heat or steam is applied. In the second procedure the fabric is impregnated with the dye solution or suspension containing no added alkali and dried. The dry fabric with its chemically unattached dye is then impregnated with the alkaline reagent and heated or steamed to obtain a wash-fast, bleach-fast dyeing.

When alkali is not present in the dye bath, as in the second procedure, the dye may be first applied to the fabric at elevated temperatures (up to 100° C.) without seriously affecting the finished dyeing. When alkali is present in the dye bath, as in the first-mentioned procedure, the dye may still be applied by steeping, but the temperature and time for steeping should be so controlled that extensive hydrolysis of the carbamate group attached to the dye is avoided. A period of 30 minutes at 60° C. is generally satisfactory. When the fiber is dried in the presence of the alkaline agent before heat or steam is applied to react the fiber with the dye, moderate drying temperatures (say, below 65° C.) should be used to avoid a possible adverse affect on the final dyeing. If desired, various additives may be dissolved in the dye bath, for such purposes as to promote exhaustion (e.g. sodium chloride, sodium sulfate), to increase solubility (e.g. urea), or to increase the wetting of the fiber by the dye bath.

Alkaline reagents that may be used in this invention to promote the reaction of the dyes with a fiber include alkali metal hydroxides, carbonates, bicarbonates, and acetates, trisodium phosphate, quaternary ammonium hydroxides such as benzyltrimethylammonium hydroxide, and the like. Dyeings may be obtained in the presence of weaker bases, but this prolongs excessively the time required to get a high quality wash-fast dyeing.

For the preparations that are described in the following examples, the parts of materials used are parts by weight. In each preparation the reaction mixture was stirred throughout the reaction.

EXAMPLE 1

10 parts of phenyl chloroformate are added to a stirred solution, in 75 parts of dimethylacetamide maintained at 50°–70° C., of 9.9 parts of the azo dye obtained by diazotizing 7-amino-1,5-naphthalene-disulfonic acid and coupling in acid medium to N-ethyl-m-toluidine. The reaction mixture is then stirred at 75° C. for 24 hours; additional 2 parts of phenyl chloroformate are added; and the temperature is raised and maintained at 115° C. for 2 hours, to complete the reaction. The product is isolated by pouring the reaction mixture into 500 parts of water and adding 50 parts of NaCl. The dye that separates is filtered off and washed with acetone. Upon drying the washed product in a vacuum desiccator, a dye is obtained whose disodium-salt form has the following structure:

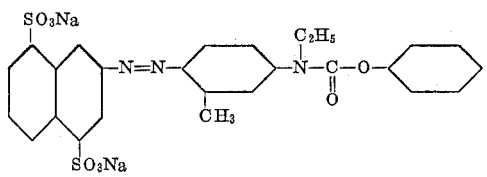

when this nonsubstantive dye is applied to cotton by the procedure described in Example 15 below, a wash fast, bleach-fast, yellow shade is obtained.

EXAMPLE 2

To 84.9 parts of the azo dye solution described in Example 1 are added dropwise at room temperature, 6.2 parts of o-methoxyphenyl chloroformate. When the addition is complete, the reaction mixture is stirred and heated at 75° C. for 16 hours. The reaction at this point is essentially complete as shown by a paper chromatogram. The reaction mass is drowned in water, precipitated with salt, and isolated as described in Example 1. The product may be applied to cotton as in Example 15 below, producing the results therein specified.

In one of my tests, a sample of the product obtainable as above was applied to cotton using the procedure of Example 15 with the following modifications: In lieu of benzyl-trimethylammonium hydroxide, sodium hydroxide was employed as base; the fabric was not redried after padding with the color and base; and the final heating step was done at about 115° C. A wash-fast, bleach-fast dyeing of yellow shade was obtained.

EXAMPLE 3

9.6 parts of the chloroformate of methyl p-hydroxybenzoate are added at room temperature to 84.9 parts of the azo dye solution described in Example 1. The reaction is heated and stirred at 50° to 60° C. for 24 hours. The mixture is cooled to room temperature, drowned in water, and made alkaline with aqueous sodium hydroxide. With the addition of sodium chloride, a dye precipitates having the same probable structure as in Example 1, except that the R is here the radical

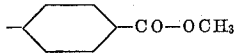

When this dye is applied to cotton as described in Example 16 below, a wash-fast, bleach-fast yellow dyeing is obtained. Equally good results are obtainable if the procedure of Example 16 is modified to effect the final heating at 155° C. for 2 minutes.

EXAMPLE 4

45 parts of o-nitrophenyl chloroformate are added to a solution of 19 parts of the dye described in Example 1, dissolved in 100 parts of dimethylacetamide, and the reaction mixture is stirred and heated at 100° C. for 16 hours. The reaction is now essentially complete as shown by a paper chromatogram. The reaction mixture is cooled to room temperature and drowned in 1500 parts of acetone. A dye having the same structure as in Example 1, except that the R here is the o-nitrophenyl radical, is obtained. When applied to cotton as described in Example 16, a wash-fast, bleach fast yellow shade is obtained.

When p-nitrophenyl chloroformate is used in place of o-nitrophenyl chloroformate in the above procedure, a similar dye is obtained, which likewise imparts to cotton a wash-fast, bleach-fast yellow shade.

EXAMPLE 5

To a solution of 23.8 parts of the azo dye, 7-amino-1,5-naphthalenedisulfonic acid disodium salt→N-methyl-m-toluidine, in 200 parts of dimethylacetamide cooled to 5° C., is added dropwise 24 parts of phenyl chloroformate. The reaction mixture is then stirred and heated at 100° C. for 19 hours, whereupon the reaction is essentially complete as shown by a paper chromatogram. When the reaction mass is drowned in water and the resultant solution is treated with salt, a dye having the same probable structure as in Example 1, precipitates, except that the R' here is CH₃. When applied to cotton as described in Example 15 a wash-fast, bleach-fast shade is obtained.

By following the same procedure but using 32.4 parts of the chloroformate ester of methyl-p-hydroxybenzoate instead of phenyl chloroformate, a dye whose disodium-salt form has the structure

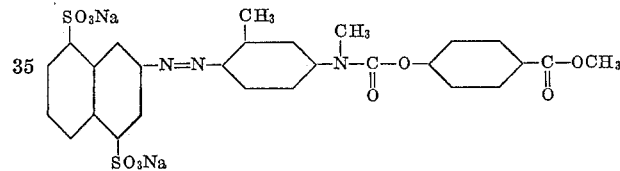

is obtained. This dye gives a wash-fast, bleach-fast yellow shade on cotton.

In a similar way, when the phenyl chloroformate is replaced by p-nitrophenyl chloroformate and by o-methoxyphenyl chloroformate, similar yellow dyes are obtained, which provide wash-fast, bleach-fast yellow shades on cotton when applied as set forth in Example 15, below.

EXAMPLE 6

To a solution in 50 parts of dimethylacetamide of 6.8 parts of the azo dye having the structure

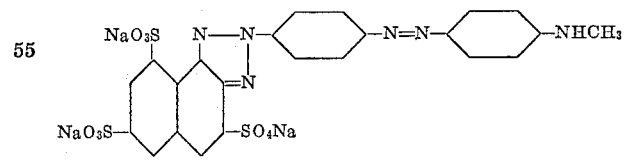

(prepared as in Example 1 of copending application of Roy E. Starn, Jr., Serial No. 772,425, now U.S. Patent 3,040,022) are added 3.1 parts of phenyl chloroformate. The solution is heated to 60° C. and then cooled to room temperature. The reaction mixture is then drowned in water, and the resultant solution is salted to precipitate the dye, which in the form of its sodium salt has the structure:

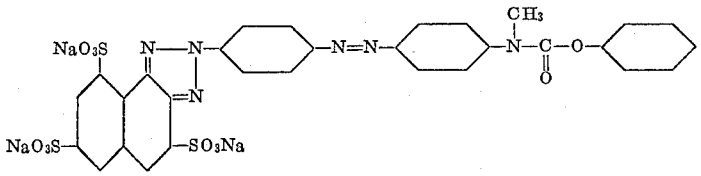

Using the procedure given in Example 15, this product dyes cotton a wash-fast, bleach-fast yellow shade.

EXAMPLE 7

50.6 parts of 2-amino-p-benzenedisulfonic acid are diazotized in known manner and coupled, in acid aqueous medium buffered by sodium acetate, to 74.6 parts of the phenyl carbamate of 6-methylamino-1-naphthol-3-sulfonic acid. The mass is then adjusted to pH 8 with aqueous sodium hydroxide, salted with sodium chloride and filtered to obtain a solid, containing the azo dye of formula:

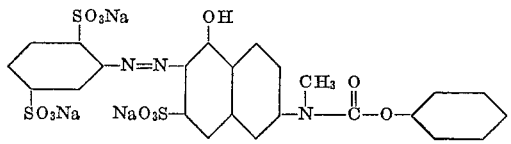

When applied to cotton according to the procedure of Example 15, this dye gives a wash-fast orange dyeing.

The phenyl carbamate of 6-methylamino-1-naphthol-3-sulfonic acid required in this example is obtained as follows: The sodium salt of 6-methylamino-1-naphthol-3-sulfonic acid, 27.5 parts, is dissolved in 300 parts of dry dimethylacetamide, and the mass is cooled to 0° to 5° C. Phenyl chloroformate, 17.1 parts, is added over a period of one-half hour, and the solution is warmed to room temperature and stirred for 24 hours. The carbamate is isolated by pouring the reaction mixture into an equal volume of water and salting with 75 parts of sodium chloride.

The same dye may also be prepared by first coupling the diazotized 2-amino-p-benzenedisulfonic acid with 6-methylamino-1-naphthol-3-sulfonic acid and then reacting with phenyl chloroformate.

EXAMPLE 8

54.7 parts of the dye having the structure

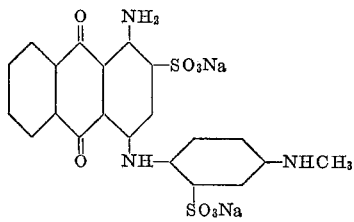

obtained by condensing 1-amino-2-sulfo-4-bromo-anthraquinone with 2-amino-5-(acetyl - N - methylamino)-benzenesulfonic acid and hydrolyzing off the acetyl group are dissolved in 500 parts of dry dimethylacetamide, and 17.1 parts of phenyl chloroformate are added dropwise over a period of one-half hour at 0° to 5° C. When the addition is complete, the solution is warmed to room temperature and stirred for 24 hours. The dye, of the probable structure

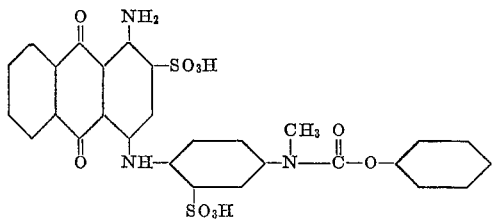

is isolated by pouring the reaction mixture into 500 parts of water, adjusting the solution to pH 4 with concentrated hydrochloric acid, and salting with 100 parts of sodium chloride. When this dye is applied to cotton by the procedure described in Example 15, a wash-fast, blue dyeing is obtained.

When the anthraquinone dye starting material in this example is replaced by 45 parts of the basic dye of formula

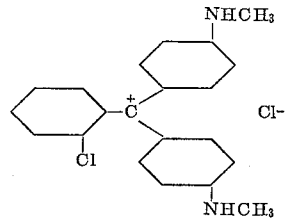

a dye yielding wash-fast red dyeings is obtained.

EXAMPLE 9

34.4 parts of the disazo dye of formula

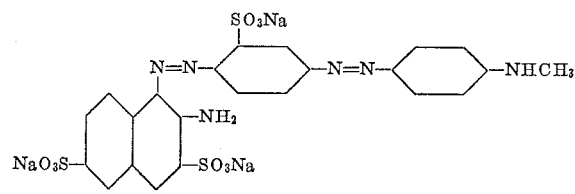

obtained as in Example 3 of copending application of Gumprecht and Reif, Serial No. 830,733, now U.S. Patent 3,109,841, are dissolved in 500 parts of N,N-dimethylacetamide at 0° to 5° C. To this solution at 0° to 5° C. is added over a period of one-half hour, 8.1 parts of phenyl chloroformate, and the resultant mixture is allowed to warm to room temperature and stir for 24 hours. The mixture is then stirred into 500 parts of water. The resultant solution is adjusted to pH 4 with sodium hydroxide solution, and sufficient NaCl is added to produce a 20% NaCl solution. The product is filtered off and dried.

The isolated red product is a fiber-reactive dye, and is believed to have the structure:

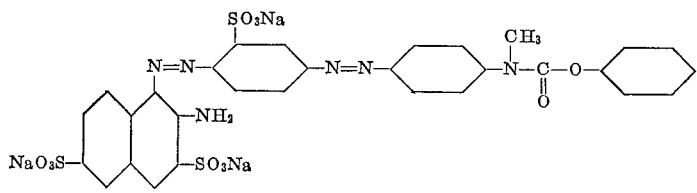

It is a brown powder which dissolves in water to give a red solution. When applied to cotton broadcloth by the procedure described in Example 15, a wash-fast, bleach-fast dyeing is obtained.

EXAMPLE 10

The water-insoluble dye, p-phenylazo-N-methylaniline, 21.1 parts, is dissolved in 200 parts of dry dimethylacetamide and phenyl chloroformate, 17.1 parts, is added dropwise over a period of one-half hour at 0° to 5° C. When the addition is complete the solution is warmed to room temperature and stirred for 24 hours. The product of formula

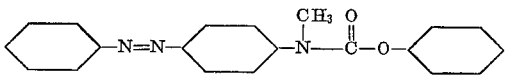

is isolated by pouring the reaction mixture into 1000 parts of water and filtering. It can be purified by recrystallization from a 2:1 by-volume mixture of isopropanol and ethylene-glycol monomethyl ether. When this dye is applied by the procedure described in Example 16, except that the dye is padded from dimethylacetamide solution, a wash-fast, bleach-fast yellow dyeing is obtained.

EXAMPLE 11

To a solution, in 150 parts of dimethylacetamide at room temperature, of 10.8 parts of the azo dye obtained by coupling diazotized 2-amino-4,8-naphthalene disulfonic acid to N-phenylbenzylamine, 6.4 parts of phenyl chloroformate are added. The reaction mixture is heated, stirred for 16 hours at 110° to 115° C. and cooled. The dye of structure

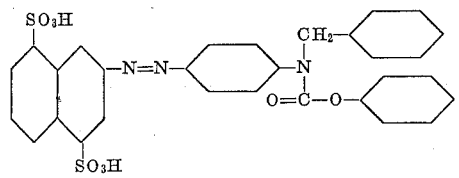

is recovered by vacuum distillation of the dimethylacetamide, followed by trituration of the residue with a boiling mixture of 400 parts of ethyl acetate and 150 parts of acetone. When this dye is applied to cotton according to the procedure of Example 15, a wash-fast, bleach-fast yellow dyeing is obtained.

EXAMPLE 12

To a solution, as in Example 11, of an azo dye as in Example 11 except that here the coupling component is N-phenyl-p-nitrobenzylamine, 3.2 parts of phenyl chloroformate are added. The reaction mixture is heated and stirred for 16 hours at 110° to 115° C., and cooled. The dye, of the same structure as in Example 11 except that the R' here is p-nitrobenzyl, is recovered as in Example 11. When it is applied to cotton according to the procedure of Example 15, a wash-fast, bleach-fast yellow dyeing is obtained.

EXAMPLE 13

To a solution, in 150 parts of dimethylacetamide at room temperature, of 10.4 parts of the azo dye obtained by coupling diazotized 2-amino-4,8-naphthalene disulfonic acid to N-β-cyanoethyl-m-toluidine, 3.2 parts of phenyl chloroformate are added. The reaction mixture is heated and stirred for 16 hours at 110° to 115° C., and cooled. The dye of structure

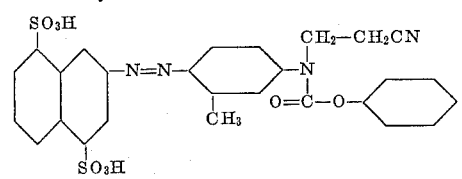

is recovered as in Example 11. When it is applied to cotton according to the procedure of Example 15, it gives a wash-fast, bleach-fast yellow dyeing.

If in the above example the N-β-cyanoethyl-m-toluidine is replaced by N-β-chloroethyl-m-anisidine, a wash-fast slightly redder yellow dyeing is obtained.

EXAMPLE 14

To a solution, as in Example 11, of an azo dye as in Example 11 except that the coupling component here is N-phenyl cyclohexylamine, 3.2 parts of phenyl chloroformate are added. The reaction mixture is heated, stirred for 16 hours at 110° to 115° C. and cooled. The dye of structure

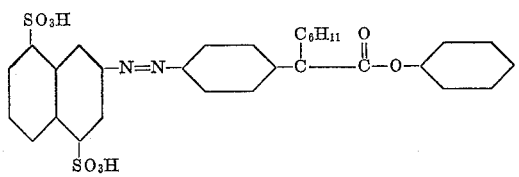

is recovered as in Example 11. When applied to a cotton according to the procedure of Example 15, it gives a wash-fast, bleach-fast yellow dyeing.

EXAMPLE 15

Dyeing procedure

A pad bath solution is prepared from one part of one of the non-substantive dyes obtained above, 4 parts of N,N-dimethylacetamide, 2 parts of a 35% solution of benzyl-trimethyl-ammonium hydroxide in methanol, and 19 parts of water. Cotton fabric is padded with the solution, wrung out, and dried at room temperature. The fabric is then heated between 150° and 160° C. for 10 minutes to achieve reaction between dye and fabric. The unfixed dye is removed by an alkaline soap scour at the boil for 3 minutes (using 3 parts of sodium carbonate and 3 parts of a condensation product of ethylene oxide and dodecanol per 1000 parts of water), and by rinsing in dimethylformamide at 60° C. for 10 minutes. A wash-fast, bleach-fast yellow dyed fabric is obtained.

In lieu of benzyl-trimethyl-ammonium hydroxide in this example, sodium hydroxide, sodium acetate, trisodium phosphate or any other strong base may be employed, and the quantity thereof may be varied considerably so long as the desired pH is achieved in the dye bath. The preferred pH range is generally between 10 and 12, but in the case of some dyes pH values as low as 8.5 will suffice.

The intermediate drying of the fabric (that is after padding and before heating) may be omitted. In fact the final heating step may be done in the presence of moisture, as by steaming.

The final heating step may be effected at temperatures lower than 150° C., say at 100° to 120° C., or at temperatures higher than 160° C., say up to 205° C., if the time in the latter case is correspondingly shortened to avoid damaging the fabric. In general, heating times between 10 minutes and 30 seconds will be sufficient.

EXAMPLE 16

Dyeing procedure

A pad solution is prepared from 1.5 parts of any of the dyes obtained in the above examples and 50 parts of water. Cotton fabric is padded with the solution and air-dried. The fabric is then padded with a solution of 3 parts of benzyl-trimethyl-ammonium hydroxide in 100 parts of a saturated solution of sodium chloride. It is again dried, heated at about 155° C. for 10 minutes, and then scoured as described in Example 15. A wash-fast, bleach-fast yellow dyed fabric is obtained.

A similar result is obtained when the fabric, after padding with the alkaline solution, is heated without drying.

The variations indicated in Example 15 as to the nature of the base, the pH selected, the temperature and period of final heating are applicable also in the procedure of the instant example. Furthermore, the same results are obtained when the base solution contains additionally up to 20 parts of urea.

*Test for wash-fastness.*—The wash-fastness referred to in the above examples has been tested by the accelerated test IIIA, Standard Test Method 61–1957, set forth in the 1958 Technical Manual of the AATCC, volume 34.

*Test for bleach-fastness.*—The bleach-fastness referred to in the above examples has been tested by Test No. IV, Standard Test Method 3–1957, in the above reference.

It will be understood that the details of the above examples may be varied widely within the skill of those engaged in this art. Thus, the dyes linked to the N-substituted aryl carbamate radical of this invention may represent any of the classes of dyes now known. The dye may contain 0 to 5 ionogenic groups such as carboxy, sulfo, phosphono groups or groups containing positively charged nitrogen atoms. The dye may be attached to the nitrogen atom of the carbamate group either through an aromatic ring or through an aliphatic side chain.

(a) CHROMOPHORIC COMPONENT

This is the color-imparting part of the reactive dye compound, the D— in the above formula for the dye. It includes dyes of the following classes, having one to three —NHR' groups for reaction with an aryl chloroformate to provide an N-alkyl substituted aryl-carbamate group or groups.

(1) Azo dyes, both monoazo and disazo dyes which may or may not be metallized as exemplified by

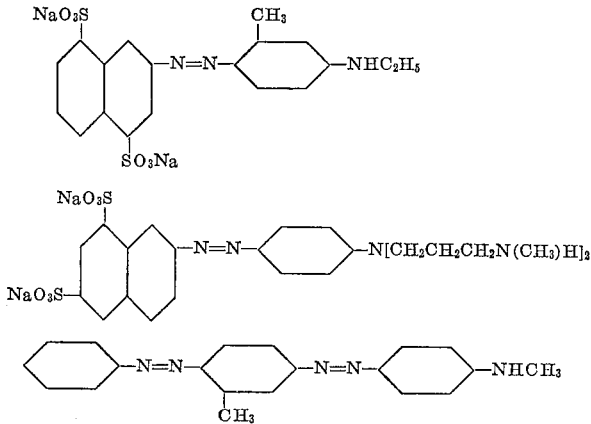

and

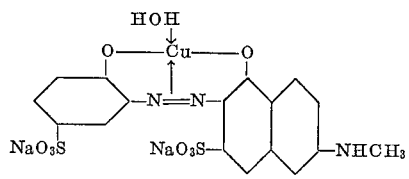

(2) Anthraquinone dyes, for example the dye of the formula:

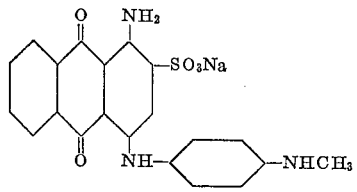

(3) Triphenylmethane or basic dyes, for example the dye of the formula:

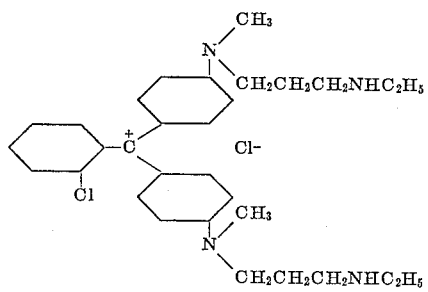

(4) Phthalocyanine dyes, for example the dye of the formula:

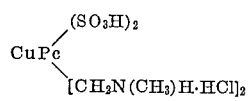

wherein CuPc represents the tetravalent radical of copper phthalocyanine.

(b) N-SUBSTITUENT OF THE ARYL CARBAMATE GROUP

This is the R' group in the intermediate dye, R—NHR' shown above and includes such groups as methyl, ethyl, isopropyl, propyl, butyl, cyclohexyl, benzyl, 2-chloroethyl, 2-cyanoethyl, nitromethyl, methylcyclohexyl, ethylcyclohexyl, methylbenzyl, ethylbenzyl, o-chlorobenzyl, p-chlorobenzyl, 2,4-dichlorobenzyl, o-cyanobenzyl, p-cyanobenzyl, o-nitrobenzyl, p-nitrobenzyl, 2,4-dinitrobenzyl, sulfobenzyl, methoxy propyl, methoxy benzyl. To put it in different words, R' may be any alkyl or cycloalkyl radical which may be substituted by any substituents other than hydroxy and amino, but including carboxylic radicals, aryl radicals, et., provided the total number of C-atoms in R' is not greater than 10.

(c) ARYL CHLOROFORMATES

These are the compounds having the structure ClCOOR that are reacted with the dyes having a general structure D—NHR' to provide a dye with an N-substituted phenyl carbamate group. The R groups of the aryl chloroformates that may be employed in this invention include phenyl, 2-biphenylyl, 3-biphenylyl, 4-biphenylyl, mixtures of the phenylyl isomers, 1-naphthyl, 2-naphthyl, o-tolyl, p-tolyl, p-isopropylphenyl, o-methoxyphenyl, p-methoxyphenyl, o-ethoxyphenyl, p-ethoxyphenyl, o-cyanophenyl, p-cyanophenyl, 4-cyano-1-naphthyl, 2-nitrophenyl, 4-nitrophenyl, 2,4-dinitrophenyl, 4-nitro-1-naphthyl, 2,4-dinitro-1-naphthyl, 1-nitro-2-naphthyl, p-sulfophenyl, o-sulfophenyl, 2,4-disulfophenyl, 3,6-disulfo-1-naphthyl, 3,6-disulfo-2-naphthyl, 6,8-disulfo-1-naphthyl, o-carboxyphenyl, p-carboxyphenyl, 2,4-dicarboxyphenyl, 2,3-dicarboxyphenyl, 2-carboxy-1-naphthyl, 4-carboxy-1-naphthyl, 2,4-dicarboxy-1-naphthyl, p-phosphonophenyl, o-methoxylsulfonylphenyl, p-methoxysulfonylphenyl, 2,4-bis(ethoxysulfonyl)phenyl, 3,6-bis(ethoxysulfonyl)-2-naphthyl, p-methoxycarbonylphenyl, o-methoxycarbonylphenyl, o-ethoxycarbonylphenyl, 2-methoxycarbonyl-1-naphthyl, (methylphosphono)phenyl, (dimethylphosphono)phenyl, (sulfomethyl)phenyl, (2-sulfoethoxy)phenyl.

In addition to the above aryl chloroformates I may react bis(chloroformates) with two moles of the dye-substituted amine, as outlined above, to obtain a compound having two chromophore groups as shown in Equation 2 which appears earlier in the specification. The requisite bis(chloroformates) in such a case may be any of the following:

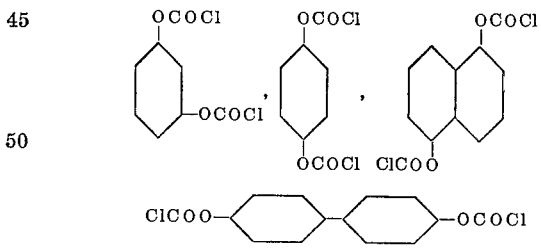

The ring structure of these bis(chloroformates) may have the substituents named above in the definition for the single chloroformates. The ring structures in the four formulas shown immediately above are, respectively, the 1,3-phenylene, 1,4-phenylene, 1,5-naphthylene, and the 4,4'-biphenylylene radicals, and they are represented by the symbol R'' in the aforementioned Equation 2 which is shown earlier in this specification.

The preferred method of preparing the dyes having N-alkyl aryl carbamate groups is to react an aryl chloroformate with an N-alkyl amino dye compound as outlined above. The dyes of the invention may also be prepared by other synthetic routes such as the reaction of carbamyl chlorides with phenols, for instance:

D—NR'COCl + ROH → D—NR'COOR + HCl

The ionogenic solubilizing groups comprise carboxy, sulfo, and phosphono radicals and radicals containing positively charged nitrogen atoms. The dyes of this invention may contain up to 5 such ionogenic solubilizing groups or none at all. These solubilizing groups may all be contained in the D part of the dye with none in the phenyl of the carbamate group, or the solubilizing groups may be distributed between the D and R of the dye having the Formula 1 above. Some may also be present on the R' radical of the carbamate group.

In the claims below, the expressions "lower alkyl" and "lower alkoxy" shall be taken to embrace respectively alkyl and alkoxy radicals of not more than 4 C-atoms each.

I claim as my invention:

1. A bleach-fast, fiber-reactive dye having a formula

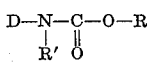

wherein

D is the radical of a water-soluble organic monoazo dye chromophore where the diazo group of said dye chromophore is a moiety selected from the group consisting of phenylnaphthotriazole, benzene, and naphthalene radicals, and where the coupling compound is a moiety selected from the group consisting of benzene and naphthalene radicals and the only substituents on said moieties are from the group consisting of (1) sodium sulfonate and (2) a combination of sodium sulfonate and methyl groups;

R is a phenyl radical which may be substituted with a substituent selected from the group consisting of methoxy, nitro and methoxycarbonyl; and R' is a member of the group consisting of methyl, ethyl, benzyl, nitrobenzyl, chloroethyl, cyanoethyl, and cyclohexyl radicals.

2. A bleach-fast, fiber-reactive dye of the formula

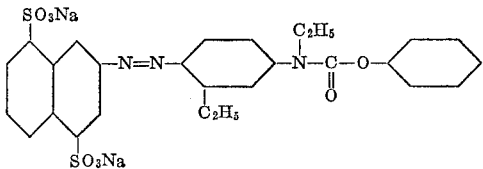

3. A bleach-fast, fiber-reactive dye of the formula

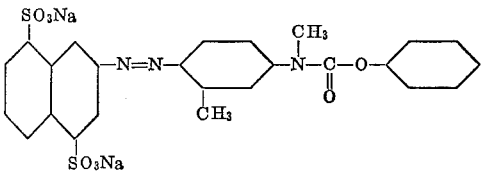

4. A bleach-fast, fiber-reactive dye of the formula

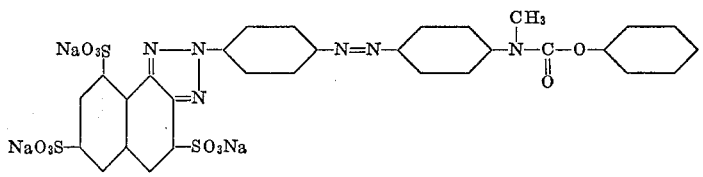

References Cited by the Examiner

UNITED STATES PATENTS

| | | | |
|---|---|---|---|
| 2,040,473 | 5/1936 | Etzelmiller | 260—176 X |
| 2,713,059 | 7/1955 | Gunthard | 260—372 |
| 2,803,625 | 8/1957 | Putter | 260—148 |
| 2,831,850 | 4/1958 | Merian et al. | 260—199 |
| 2,870,137 | 1/1959 | Merian et al. | 260—207.1 X |
| 2,880,052 | 3/1959 | Conciatori et al. | 8—1.2 |
| 2,892,670 | 6/1959 | Alsberg et al. | 8—1.2 |
| 2,938,896 | 5/1960 | Strobel et al. | 260—151 |
| 2,961,437 | 11/1960 | Steinemann et al. | 260—151 |
| 2,991,280 | 7/1961 | Schetty et al. | 260—151 |
| 3,040,022 | 6/1962 | Starn | 260—153 |
| 3,109,841 | 11/1963 | Gumprecht et al. | 260—153 |

FOREIGN PATENTS

| | | |
|---|---|---|
| 1,205,213 | 8/1959 | France. |
| 1,205,622 | 8/1959 | France. |

CHARLES B. PARKER, *Primary Examiner.*

MORRIS O. WOLK, *Examiner.*

UNITED STATES PATENT OFFICE
CERTIFICATE OF CORRECTION

Patent No. 3,222,352                                    December 7, 1965

John J. Monagle, Jr.

It is hereby certified that error appears in the above numbered patent requiring correction and that the said Letters Patent should read as corrected below.

Column 13, lines 41 to 47, for that portion of the formula reading

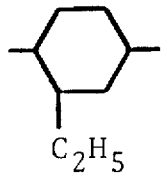        read        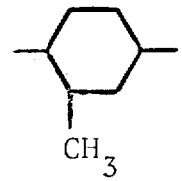

Signed and sealed this 11th day of October 1966.

(SEAL)
Attest:

ERNEST W. SWIDER                            EDWARD J. BRENNER
Attesting Officer                                    Commissioner of Patents